United States Patent [19]

Ilic et al.

[11] Patent Number: 5,517,422

[45] Date of Patent: May 14, 1996

[54] METHOD AND APPARATUS FOR DIRECT CONTROL OF THE INTER-AREA DYNAMICS IN LARGE ELECTRIC POWER SYSTEMS

[75] Inventors: Marija Ilic, Sudbury; Xiaojun Liu, Belmont, both of Mass.

[73] Assignee: Massachusetts Institute of Technology, Mass.

[21] Appl. No.: 134,280

[22] Filed: Oct. 12, 1993

[51] Int. Cl.[6] .............................. H02J 3/06; G06F 19/00
[52] U.S. Cl. .............................. 364/492; 364/483; 307/57
[58] Field of Search ............................. 364/492, 493, 364/483; 361/139; 307/57, 52, 153

[56] References Cited

U.S. PATENT DOCUMENTS 3,913,829  10/1975  Fink ........................................ 364/493
4,419,733  12/1983  Ross ........................................ 364/493

OTHER PUBLICATIONS

Gyugi, "A Unified Power Flow Control Concept for Flexible AC Transmission Systems" AC and DC Power Transmission, 1991, pp. 19–26.

Primary Examiner—Edward R. Cosimano
Assistant Examiner—M. Kemper
Attorney, Agent, or Firm—Wolf, Greenfield & Sacks

[57] ABSTRACT

A method and apparatus for directly controlling the net power flow on tie lines between different areas of a large electric power system, which provides automatic dynamic control to maintain the stability of the system. Utilizing a sensitivity matrix and simple measurements of real power output from each of the generators in a given area, it is possible to dynamically control the entire system in a way which accounts for loading changes in any area. The control can be implemented using a Flexible AC Transmission Systems (FACTS) technology controller which utilizes the measurements and sensitivity matrix from a given area to determine a derived net power flow from the first area to the remainder of the system, and for comparing the derived net power flow to a set point to provide an error signal which approaches zero as the controller adjusts, for example, a phase angle difference across the tie line to adjust the net power flow thereon. Alternatively, the derived net power flow can be used for scheduling the generation of power in a given area and/or to control a local controller at the generator level.

39 Claims, 7 Drawing Sheets

METHOD AND APPARATUS FOR DIRECT CONTROL OF THE INTER-AREA DYNAMICS IN LARGE ELECTRIC POWER SYSTEMS

This invention was made with government support under Grant Number 9120837-ECS awarded by the National Science Foundation. The government has certain rights in the invention.

FIELD OF THE INVENTION

The present invention relates to a method and apparatus for controlling the power flow in, for example, a large electric power system, and more particularly to a system which can utilize Flexible AC Transmission Systems (FACTS) Technology to provide real time control of power flow.

BACKGROUND OF THE INVENTION

This invention is motivated by the need to model, analyze and control interactions among the administratively separated subsystems of an electrically interconnected large scale power system by more direct and simpler approaches than available at present. Understanding the dynamics of interactions among subsystems is important for a variety of reasons. The most recently emerging needs are seen through the presence of the inter-area oscillations [M. Klein, G. Rogers, P. Kundur, "A Fundamental Study of Inter-area Oscillations in Power Systems", *IEEE Trans. on Power System*, vol. 6, no. 3, August, 1991; NYPP-OH TSWG Report, Phase V, Planning Studies, vol I, August, 1992] and the potential to control them by implementing fast, power-electronic switched controllers. The new control hardware technology of this type is presently being developed and tested anti it is often referred to as the FACTS technology [Proceedings: FACTS Conference I: The Future of High-voltage Transmission, EPRI TR-100504, March 1992;Proceedings: FACTS Conference II, EPRI TR-101784, Dec. 1992].

Much work in studying the potential of FACTS technology for controlling the inter-area dynamics has been very specific to a chosen technology, and/or to the simulation efforts to illustrate their potential performance in surpressing a specific problem of a given system. Very little work exists at present on understanding structural relations between the inter-area dynamics and the means for controlling them. For example, within a wide variety of control technologies available it is not clear which class of devices is most efficient in controlling a particular sub-class of dynamic problems. A subproblem of controlling real power dynamics by controlling directly phase angle differences across tie-lines on which phase-shifting transmission devices are located, under the assumption that coupling with voltage changes is negligible, has barely been studied in this setting.

This invention is concerned with systematic ways of using local area measurements on a large electric power system which would provide for controlling the inter-area dynamics according to desired performance specifications.

The emphasis of the invention is on the state-space variables necessary to process the measurements in such a way that this goal is achieved. This is the first time that system-wide effects of local FACTS devices are quantified in order to guarantee the performance at the system level. Instead, in prior proposed systems the FACTS devices and their local controls are tested on a specific operating problem. The set point of a local controller is assigned using quasi-static studies of the system at a Control Center level, and its rescheduling is done open-loop. The only closed-loop control has been local in nature. This invention requires dynamic measurements of selected variables from the local area, and not only at the location at which the control apparatus is located. The technology is robust with respect to the required measurements, since they can be provided with a high accuracy and are feasible in real-time using only existing technologies.

SUMMARY OF THE INVENTION

In this invention a method and apparatus is provided for controlling, for example, inter-area oscillations in a very large-scale power system. The invention is based on using new state-space formulations of power system dynamics. This choice of state-space enables one to represent even the non-linear dynamics in the standard stAte-space form of the Ordinary Differential Equations (ODE's), instead of Differential Algebraic Equations (DAE's) [D. Hill, I. Marcels, "Stability Theory for Differential/Algebraic Systems with Applications to Power Systems", *IEEE Trans. on Circuits and Systems*, vol. CAS-37, no. 11, pp. 1416–1423, November 1990], which significantly facilitates control design tasks. Furthermore, it sets the basis for control design in terms of measurements simple to perform, and therefore promises considerable robustness.

Next, the physical devices for controlling the inter-area oscillations are capable of directly controlling flows of transmission lines on which they are located. Some examples of such devices are phase-shifting transformers, HVDC transmission lines and series capacitors. If these devices are controlled by means of fast power electronic switching they can be categorized under the well recognized class of the Flexible AC Transmission Systems (FACTS) devices. The systems-based control design of this invention allows for the first time to achieve a prospecified desired performance of the inter-area dynamics.

In one embodiment of the present invention a controller is provided which controls the power line flow or the voltage phase-angle difference across a transmission line of an electrical power system by means of fast power electronic switching of tap-position on a phase-shifting transformer located on this transmission line. The same control design is applicable to a wide variety of present and future technologies able to directly control transmission line flows.

An electrical power system in accordance with the invention, includes a control device which directly controls the real power line flow of the transmission tie line on which it is located. Sensors provide measurements of real power outputs from all generators in a given area which controls the specific line flow via such control device. The measurements are processed digitally to obtain the actual net tie line flow out of the area needed to determine deviation from its specified (set) value. A controller regulates the transmission line flow in response to these measurements.

Two qualitatively different designs are provided: The first design includes a FACTS-type device on all transmission tie lines interconnecting administratively separated (yet electrically still connected) areas. The second design allows for only selected locations of FACTS devices, primarily because of their high cost at present.

When all tramnission lines interconnecting administratively separate utilities are equipped with FACTS devices, and controlled according to the invention, the design fully guarantees stable regulation of the inter-area dynamics of the interconnected system.

When only selected locations (i.e. tie-lines) are equipped with the FACTS devices, the choice of number and location of these devices may have a significant effect on the inter-area dynamics. The invention provides means of deciding on the best locations of these devices. If they do not disturb stable intra-area dynamics (controlled via generators primarily), it is possible to guarantee performance of the inter-area dynamics within certain thresholds.

In a broad sense, Applicant's invention is intended for use in an electrical power system which includes a plurality of areas with generators and loads, the areas being electrically connected by tie lines. The improvement is directed to providing means for measuring the real power outputs of each generator in a first area, and generating a measurement signal indicative thereof. Further, a means, responsive to the measurement signal, is provided for deriving a net power flow from the first area to the remainder of the system along the tie lines, and for generating a derivation signal indicative thereof. Finally, means are provided, responsive to the derivation signal, for dynamically controlling the actual net power flow from the first area to the remainder of the system along the tie lines. Similarly, in the method of the invention, the steps include measuring the real power outputs of each generator in the first area, deriving a net power flow from the first area to the remainder of the system, and using the derived net power flow to dynamically control the actual net power flow from the first area to the remainder of the system.

In a preferred embodiment, the derivation of the net power flow is made by deriving a weighted sum of the real power outputs from all of the generators in the first area, which are weighted with respect to the electrical distance of each generator from a location on the tie line where the control is applied. More specifically, the derived net power flow $y^i$ is determined from $$y^i = p^i P_G^i \tag{a}$$

where $p^i$ is a participation factor;

$P_G^i$ is a set of the real power outputs from each of the generators in the first area; and, i designates the first area having a plurality of generators G and loads L electrically connected by a network N;

and wherein $p^i$ is calculated from:

$$p^i K_p^i = 0 \tag{b}$$

where:

$K_p^i$ is an effective participation factor of generator and load power in derived net power flow $y^i$, and is defined by:

$$K_p^i = J_{GG} + J_{GL} C_\omega \tag{c}$$

where:

$C_\omega$ represents for a contribution of power changes at loads in derived net power flow $y^i$, and is defined by:

$$C_\omega = -J_{LL} J_{LG} \tag{d}$$

where J is a sensitivity matrix of real power flows into the network with respect to phase angles, and is defined by:

$$J = \frac{\partial \underline{P}^N}{\partial \underline{\delta}} = \begin{bmatrix} J_{GG} & J_{GL} \\ J_{LG} & J_{LL} \end{bmatrix} \tag{e}$$

where $\underline{P}^N$ is a complex power flow defined by:

$$\underline{P}^N = (\underline{P}_G^N, \underline{P}_L^N) \tag{f}$$

where $\underline{P}_G^N$ is a set of all real power flows from all generators in area i into the network N;

$\underline{P}_L^N$ is a set of all real power flows from all loads in area i into the network N;

and where $\underline{\delta}$ is a complex phase angle defined by:

$$\underline{\delta} = (\underline{\delta}_G, \underline{\delta}_L), \tag{g}$$

where:

$\underline{\delta}_G$ is a set of all voltage phase angles of all generators in area i;

$\underline{\delta}_L$ is a set of all voltage phase angles of all loads in area i;

and where:

$J_{GG}$ is a sensitivity submatrix $(\partial \underline{P}_G^N / \partial \underline{\delta}_G)$ of net power flows out of generators with respect to generator phase angle;

$J_{LG}$ is a sensitivity submatrix $(\partial \underline{P}_L^N / \partial \underline{\delta}_G)$ of net power flows out of loads with respect to generator phase angle;

$J_{GL}$ is a sensitivity submatrix $(\partial \underline{P}_G^N / \partial \underline{\delta}_L)$ of net power flows out of generators with respect to load phase angle;

$J_{LL}$ is a sensitivity submatrix $(\partial \underline{P}_L^N / \partial \underline{\delta}_L)$ of net power flows out of loads with respect to load phase angle;

where all voltages are measured between a node in the network and ground. A controller is preferably provided on one or more of the tie lines which compares the derivation signal to a desired net power flow and determines a net error signal. The controller then adjusts the actual tie line power flow in order to cause the net error signal to approach zero. The controller may take various forms, such as an apparatus for adjusting the voltage phase angle difference across the tie line, or for adjusting both the magnitude and phase angle of the voltage at one end of the tie line where the controller is disposed. The controller may be a static phase shifter transformer incorporating FACTS technology and having an electronically controlled tap position. Another type of control apparatus is an HVDC apparatus, which converts the alternating current signal from one area to a direct current signal for transmission across the tie line, and reconverts back to an alternating current signal at the other end.

The system is particularly useful for maintaining system stability below a frequency of one hertz (Hz). In particular, the system enables the suppression of inter-area oscillations.

In another embodiment, the measurements of the real power outputs of each generator in a first area, are transmitted to a computer which derives a net power flow from the first area to the remainder of the system along the tie lines, and which compensates for transmission losses within the network of the first area. The derived net power flow can be used to schedule the generation of power within the first area, in order to meet the dynamic power transfer requirements of the first area to the other areas. Furthermore, the derived net power flow can be used to provide local control of the real power output at the generator. For example, FIG. 5 shows a control computer 18 with control lines 19 connected to local controllers 20 for providing local control of the real power output at each generator G in area 1. These and other embodiments of the present invention will be more particularly described in accordance with the following drawings and detailed description.

DETAILED DESCRIPTION OF THE INVENTION

The detailed description of the invention is organized as follows: First a summary of modeling power system dynamics via ODE's in the newly proposed state-space is presented. This is followed by a brief summary of the inter-area real power/frequency dynamics using the new state-space is given. Next, a control design is proposed and illustrated on a simple 2-area 5-bus power system. An approach is taken that since not all tie-lines (i.e. transmission lines connecting administratively separated areas) are equipped with expensive control devices which can control their flows directly, the flows in tie-lines which are not directly controlled are viewed as uncertainties. Establishing bounds on these uncertainties is achieved by looking at the closed-loop dynamics of the entire system.

1) Real Power/Frequency Dynamics of an Interconnected System in New Coordinates Any electric power system of arbitrary topology can be thought, of as consisting of generators locally controlled and interconnected to the loads through a transmission network. Local generator controllers are governors which control their mechanical power output deviations $P_{mech}$ in response to the frequency deviations $\omega_G$. The relevant output variables on the generator side affecting the transmission network and the loads are real power $P_G$ and frequency $\omega_G$. The $P_L, \omega_L$ are corresponding variables at the load side. The dynamics of turbine-generator sets, combined with the governor dynamics, forms what is referred to as the local dynamics of the governor-turbine-generator sets. For frequency ranges of interest in normal operating conditions the network is modeled as an algebraic constraint imposed on generator and load outputs. Loads are typically modeled as sinks of constant power

1.1) Dynamics of a Single Generator

Here the primary dynamics of each individual G-T-G set are considered. We adopt the same starting model as in M. Calovic, Dynamic State-Space Models of Electric Power Systems, Technical Report of the University of Illinois at Champaign, Electric Power Systems Group, 1971. In general, the complexity of the equations may vary, depending on the complexity of the actual type of a G-T-G set and modeling assumptions. Only its structure is important for the concepts in this work which is common to all designs and is illustrated here using fairly simple G-T-G models.

Figure 1:
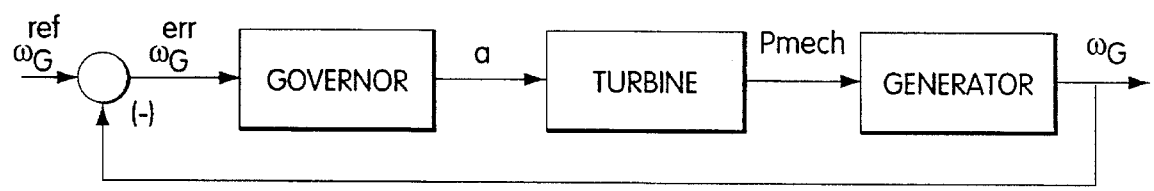
FIG. 1 is a block diagram of a standard local controller which provides primary control of a governor-turbine-generator (GTG) set.

FIG. 1 shows a block diagram representing a single governor-turbine-generator (G-T-G) set. In this Figure $\omega_G^{ref}$ is the set frequency value for the governor.
Generator dynamics is given via $$M\dot{\omega}_G + D\omega_G = P_{t\alpha} + e_T\alpha - P_G \qquad (1)$$

the linearized turbine dynamics as $$T_u \dot{P}_{t\alpha} = -P_{t\alpha} + K_t \alpha \qquad (2)$$

and the linearized dynamics of the governor $$T_g \dot{\alpha} = -\tau\alpha - \omega_G \qquad (3)$$

The notation $\dot{X}$ above any given variable X stands for its derivative with respect to time.

Parameters M, D, $T_u$, $T_g$ are moment of inertia of the combined G-T-G set, its damping coefficient, and time constants of the turbine and governor, respectively. Parameters $\tau$ and $e_T$ are sensitivities of $\omega_G$ with respect to valve position $\alpha$ and the time constant of the valve dynamics, respectively $P_{t\alpha}$ and $P_G$ are the mechanical power directly regulated by the valve opening $\alpha$ and the electric power of the generator, respectively. In the state space form, with $x_{LC} = [\omega_G \; P_{t\alpha} \; \alpha]^T$, one can re-write the local (LC) primary dynamics (1)–(3) for each G-T-G set as $$\dot{x}_{LC} = \begin{bmatrix} -D/M & 1/M & e_T/M \\ 0 & -1/T_u & K_t/T_u \\ -1/T_g & 0 & -\tau/T_g \end{bmatrix} x_{LC} + \begin{bmatrix} -1/M \\ 0 \\ 0 \end{bmatrix} P_G \qquad (4)$$

$$\equiv A_{LC} x_{LC} + c_M P_G$$

$A_{LC}$ is the system matrix of each generator. Properties of system matrix $A_{LC}$ determine the response of each generator to its real power demand while maintaining its frequency within the steady-state error determined by its droop characteristic [J. Zaborszky, J. Rittenhouse, Electric Power Transmission, The Rensselear Bookstore, Troy, N.Y., 1969].

1.2) Network Constraints

A model of the interconnected system is obtained by subjecting the individual machine models (1)–(3) of all machines to the transmission network constraints which relate real power generation $P_G$ to the real power flows in the transmission lines of each area $P_G^N$ and the real power flows from the neighboring area $F_G$. The only direct coupling of each machine to the rest of the system is through this real power output. Network constraints are typically expressed in terms of nodal type equations that require complex valued power into the network $\hat{S}^N$ to be equal to the complex valued power $\hat{S} = P + jQ$ injected into each node $$\hat{S}^N = \text{diag}(\hat{V})\hat{Y}_{bus}{}^* \hat{V}^* = \hat{S} \qquad (5)$$

where $\hat{S}^N = P^N + jQ^N$ is the vector of net complex power flow into the network N of the area, $\hat{Y}_{bus}$ is the admittance matrix of the network. $\hat{V} = V e^{j\delta}$ is the vector of all nodal voltage phasors, with magnitude V and phase $\delta$.

Symbols $\hat{X}$ and $X^*$ are used to denote any complex valued number X and its conjugate, respectively.

The algebraic network constraint (5) can be formulated in terms of ODE's of the form $$\dot{P}_G = K_P \omega_G + \dot{F}_e - D_P \dot{P}_L \quad (6)$$

where $P_G$ is the vector of real power outputs from generators, $K_P$ is given by $$K_P = J_{GG} + J_{GL} C_\omega \quad (7)$$

It is shown below that this matrix plays a fundamental role in computing participation of area's generator outputs to its net inter-area dynamics.

Matrix $C_\omega$ is defined as $$C_\omega = -J_{LL}^{-1} J_{LG} \quad (8)$$

and it accounts for contribution of load power changes in the area as seen at the generator locations where the actual measurements are performed.

$$J = \frac{\partial P^N}{\partial \delta} = \begin{bmatrix} J_{GG} & J_{GL} \\ J_{LG} & J_{LL} \end{bmatrix} \quad (9)$$

Matrix $J$ is the fundamental sensitivity matrix of real power flows into the network with respect to voltage phase angles, and is commonly known at each area level.

Here $F_e$ represents effective tie-line flow as seen by each generator and is given as $$F_e = D_P F_L - F_G \quad (10)$$

where $$D_P = J_{GL} J_{LL}^{-1} \quad (11)$$

This matrix $D_P$ represents the participation of the tie-line flows out of load nodes at the area boundary in the effective tie-line flow affecting the dynamics of generating units.

1.3) Real Power/Frequency Dynamics of an Interconnected System in New Coordinates Consider a single region with m generators within an interconnected system. The state space formulation of the linearized dynamics of all G-T-G sets on the system (4), together with the network constraint equation (6), forms the closed-loop dynamic model of the interconnected system. Local dynamics of generators are related through variations in $P_G$ only. This is seen by defining $$x_{LC} = \begin{bmatrix} x_{LC}^1 \\ \cdot \\ \cdot \\ \cdot \\ x_{LC}^m \end{bmatrix}, P_G = \begin{bmatrix} P_G^1 \\ \cdot \\ \cdot \\ \cdot \\ P_G^m \end{bmatrix}, \omega_G = \begin{bmatrix} \omega_G^1 \\ \cdot \\ \cdot \\ \cdot \\ \omega_G^m \end{bmatrix}, \quad (12)$$

and $$A_{LC} = \begin{bmatrix} A_{LC}^1 & & \\ & \cdot & \\ & & A_{LC}^m \end{bmatrix}, C_M = \begin{bmatrix} c_M^1 & & \\ & \cdot & \\ & & c_M^m \end{bmatrix} \quad (13)$$

The generator frequencies are part of the local generator states, given by $$\omega_G = E x_{LC} \quad (14)$$

with the matrix E=block diag(e,e, . . . ,e) and e=[1 0 0].

The standard state-space model of the single region within the interconnected system in terms of the tie-line flows explicitly takes on the form $$\begin{bmatrix} \dot{x}_{LC} \\ \dot{P}_G \end{bmatrix} = \begin{bmatrix} A_{LC} & C_M \\ K_P E & 0 \end{bmatrix} \begin{bmatrix} x_{LC} \\ P_G \end{bmatrix} + \begin{bmatrix} 0 \\ \dot{F}_e \end{bmatrix} + \begin{bmatrix} 0 \\ -D_P \end{bmatrix} \dot{P}_L \quad (15)$$

The system matrix for the region is $$A = \begin{bmatrix} A_{LC} & C_M \\ K_P E & 0 \end{bmatrix} \quad (16)$$

The augmented state variables within each area are $$x_{new} = x = \begin{bmatrix} x_{LC} \\ P_G \end{bmatrix} \quad (17)$$

instead of traditionally used $$x_{old} = \begin{bmatrix} x_{LX} \\ \delta_G \end{bmatrix} \quad (18)$$

Keeping in mind that (15) is true for any single area within an interconnected system, we obtain the dynamic model for each area explicitly in terms of the tie-line flows among the areas i as $$\dot{x}^i = A^i x^i + \begin{bmatrix} 0 \\ \dot{F}_e^i \end{bmatrix} + \begin{bmatrix} 0 \\ -D_P^i \end{bmatrix} \dot{P}_L^i \quad (19)$$

2) Inter-area Real Power Dynamics in New Coordinates

A closer look at the model (15) expressed in terms of the new state-variables reveals that the properties of the real power/frequency dynamics are directly determined by the properties of the network matrix $K_P$ under certain mild assumption on local states $x_{LC}$ at each component level. Furthermore, under the same assumption the basic properties of the inter-area dynamics are directly determined by examining the structure of the network matrix $K_P$. To show this we first review several basic properties of the system matrix $K_P$. These properties, listed as the following propositions, are used to propose a general definition and interpretation of the inter-area dynamics.

Propositions: For any isolated power system (lossy or lossless),

1. $K_P 1 = 0$, i.e. the row sum of $K_P$ is 0. This is equivalent to $K_P$ being singular with 1 as the right eigenvector corresponding to its 0 eigenvalue.
2. $1^T K_P = 0$, for a lossless network, i.e. $1^T$ is also the left eigenvector corresponding to the 0 eigenvalue.

where $1 = [1 \ldots 1]^T$.

3) Definition of the Inter-area Variables

To extract the inter-area dynamics, we introduce the generalized inter-area, variables in the following Definition: The inter-area variables y are variables which satisfy $$y(t) = \text{constant} \quad (20)$$

when all interconnections among the subsystems $S^i$, i=1, . . . ,R are moved, and the system is free of disturbances.

Note from this definition that the inter-area variables y are local variables associated with each area. There is no coupling among different areas, since they are defined in terms of the disconnected areas. In other words, the inter-area variables for area i are a function of the state variables of area, i only. Note also that for a linear system, it is expected that the inter-area variables y can be expressed as a linear combination of state variables x. This linear dependence is expressed as $$y^i = P^i x^i, \quad i = I, II, \ldots \quad (21)$$

with the "participation factor" $P^i$ satisfying $$P^i A^i = 0 \quad (22)$$

3.1) Computation of Inter-area Variables

Next, using the above definition, the basic structure of the model (19) and properties of matrix $K_P$ listed in the propositions, we briefly address the existence and uniqueness of transformation $P^i$, $i = I, \ldots, R$ as well as the computational complexity involved in deriving $P^i$.

Since we are only interested in the inter-area dynamics (and not in the local dynamics of each generator), take the form for $P^i$ as $$P^i = [0 \; p^i] \quad (23)$$

where $p^i$ is a matrix to be determined from the condition (22). With this form, (22) becomes $$p^i K_P^i = 0 \quad (24)$$

Clearly $p^i$ is the left eignenvector of matrix $K_P^i$ corresponding to its 0 eigenvalue. This also proves the uniqueness of $p^i$ up to a scalar.

It is emphasized that in order to obtain $p^i$ the eigenanalysis is not necessary, since (24) can be easily solved by simple Gauss elimination-like methods. For a lossless network, computation of $p^i$ is trivial. Recall from Proposition 2 that $p^i = 1^T$.

By introducing definition (20) it directly follows from (19) that the inter-area dynamics model takes on the form $$\dot{y}^i = P^i \begin{bmatrix} 0 \\ \dot{F}_e^i \end{bmatrix} + P^i \begin{bmatrix} 0 \\ -D_{P^i} \end{bmatrix} \dot{P}_L^i = p^i(\dot{F}_e^i - D_{P^i}\dot{P}_L^i) \quad (25)$$

4) Control Design for Inter-area Dynamics

The forms proposed in models (15) and (25) could be used as a basis for re-visiting control tasks on an interconnected power system.

To start with, one can see from the structure of system (15) that it is possible at each generator level, or more generally, for each system component whose local dynamics are not negligible and which is equipped with local controls, to design local controls according to specifications within the given $P_G^i$ range of interest. The minimum requirement is to design their primary controllers so that $A_{LC}^i$ have stable eigenvalues. This step is consistent with the present, practice of tuning controllers locally against an infinite bus. Once primary controllers are designed this way, the aggregate model (25) can be used to add controllers relevant for the inter-area dynamics. This model is expressed in terms of the net tie-line flows $F_e$ only, and unless extremely unusual operating conditions associated with the operating point-dependent rank deficiencies of matrix $K_P(\delta)$) arise, it will be of a low order corresponding to the number of areas. Control design problems relevant for the inter-area dynamics depend on the actual number of tie-lines directly controlled. Here we briefly discuss the case when all tie-lines are controlled, as well as when only a limited number of controllers is used.

4.1) All Tie-lines Directly Controlled

If all components of $F_e$ are assumed to be directly controllable, using FACTS devices for example, model (25) can be viewed from a control design point as being of the form $$\dot{y} = pu(u) + d \quad (26)$$

where p is the participation factor matrix, and load variations $\dot{P}_L$, typically not measurable, can be treated as a disturbance d. Changes of flows $F_e$ defined in (10) as a combination of flows into area generator nodes $F_G$ and into the load nodes $F_L$, could form control candidates u to be directly controlled according to specifications of the inter-area dynamics. If the inter-area dynamics are to meet particular response characteristics, including elimination of slow, persistent oscillations, specific flows $F_G$ and/or $F_L$ will need to be controlled. Notice that model (26) of inter-area dynamics can be seen as entirely control/disturbance driven. The intra-area dynamics of primary components should be stabilized at the primary components design level by assuring that $A_{LC}^i$, $i = 1, \ldots, m$, have stable eigenvalues. In the ideal case when all tie-lines are equipped with the additional control hardware capable of directly regulating real power flows, each area i could directly regulate its inter-area variable $y^i$ responsible for interactions with the neighboring areas by simply regulating it to the scheduled value $y_{ref}^i$, according to $$\dot{F}_e^i(y^i) = u^i(e^i) \quad (27)$$

where $e^i = y^i - y_{ref}^i$ is the error of the inter-area variables, and the function $u^i(e^i)$ can take on the general form $$u^i(e^i) = G_P^i e^i + G_I^i \int e^i dt + G_D^i \dot{e}^i \quad (28)$$

Figure 2:
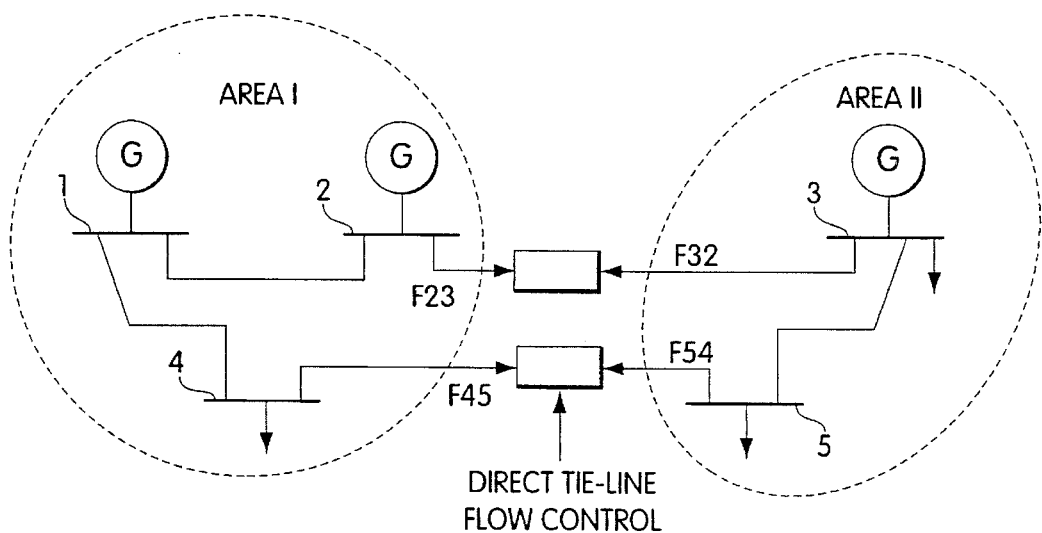
FIG. 2 is a block diagram of an example of an electric power utility system equipped with power line flow controllers in accordance with the present invention.

It can be seen from (10) that the effective tie-line flows $F_e^i$ corresponding to each specific area i can be achieved by a variety of combinations of individual tie-line flows into the boundary generators, $F_G^i$, and into the boundary loads $F_L^i$. Formula (10) can be used to decide on the most effective locations of individual controllers which could achieve $F_e^i$ needed to stabilize the inter-area variables to its scheduled value $y_{ref}^i$. FIG. 2 shows schematics of such controls on a 5-bus example. The area 1 consists of nodes 1,2 and 4 and area 2 of nodes 3 and 5. Nodes 1 and 2 are generators in area 1, and node 3 is a generator belonging to area 2. Node 4 is a load in area 1, and, similarly, node 5 is 1 load in area 2. The devices which have the ability to directly affect power flow on the line on which they are located are symbolically set on both tie-lines interconnecting the two areas. In this example, $F_G^I = [0 \; F_{23}]^T$; $F_G^{II} = F_{32}$; $F_L^I = F_{45}$; Fhd $L^{II} = F_{54}$. It follows that the inter-area variables are measurable directly through measurements of the real power generation in the area, and in this example, they take the form $$y^I = p^I P_G^I = P_{G1} + 0.9969 P_{G2} \quad (29)$$

$$y^{II} = p^{II} P_G^{II} = P_{G3} \quad (30)$$

Using (10) it follows that $$F_e^I = \begin{bmatrix} \dfrac{\partial P_{G1}}{\partial \delta_4} \\ \dfrac{\partial P_{G2}}{\partial \delta_4} \end{bmatrix} \begin{bmatrix} \dfrac{\partial P_{L4}}{\partial \delta_4} \end{bmatrix}^{-1} F_{45} - \begin{bmatrix} 0 \\ F_{23} \end{bmatrix} \quad (31)$$

$$F_e^{II} = \begin{bmatrix} \dfrac{\partial P_{G3}}{\partial \delta_5} \end{bmatrix} \begin{bmatrix} \dfrac{\partial P_{L5}}{\partial \delta_5} \end{bmatrix}^{-1} F_{54} - F_{32} \quad (32)$$

Using (25) the dynamics of inter-area variables in this case are $$\dot{y}^I = p^I \left( \dot{F}_e^I - \begin{bmatrix} \frac{\partial P_{G1}}{\partial \delta_4} \\ \frac{\partial P_{G2}}{\partial \delta_4} \end{bmatrix} \begin{bmatrix} \frac{\partial P_{L4}}{\partial \delta_4} \end{bmatrix}^{-1} \dot{P}_{L4} \right) \quad (33)$$

and $$\dot{y}^{II} = p^{II} \left( \dot{F}_e^{II} - \begin{bmatrix} \frac{\partial P_{G3}}{\partial \delta_5} \end{bmatrix} \begin{bmatrix} \frac{\partial P_{L5}}{\partial \delta_5} \end{bmatrix}^{-1} \dot{P}_{L5} \right) \quad (34)$$

Defining the inter-area controls as $$p^i u^i = p^i \dot{F}_e^i, \quad i=I,II \quad (35)$$

general form (26) is illustrated.

If changes in tie-line flows $\dot{F}_e^i$ are directly controllable via FACTS type devices, according to the general control law (27) in this case, they take on the form $$p^i \dot{F}_e^i = G_P^i (p^i P_G^i - p^i P_{Gref}^i) + G_I^i \int (p^i P_G^i - p^i P_{Gref}^i) dt + \quad (36)$$

$$G_D^i \frac{d}{dt} (p^i P_G^i - p^i P_{Gref}^i)$$

for i=I,II. Control gains here can be designed according to the standard design methods for low order systems. In this case, the actual amount of required $\dot{F}_e^I$ is achieved by controlling directly a combination of $F_{45}$ and $F_{23}$ according to (31), and $\dot{F}_e^{II}$ by controlling $F_{54}$ and $F_{32}$ according to (32). Specific electric characteristics seen through the sensitivity matrices in formulae (31)–(32), and the values of $p^i$, i=I,II need to be studied in deciding on the best locations and amounts of the actual controllers.

The goal is to put FACTS devices at the tie-lines whose change in flow affects most the change of the inter-area variable $y^i(t)$ of interest. To illustrate this design process, consider the task of stabilizing $y^I(t)$ in this specific example. Two components contribute to the change of $y^I(t)$, i.e., changes in $F_e^I(t)$ and $P_{L4}(t)$. Since it is assumed throughout this invention that power variations at loads are not controllable (nor measured), the only way to effect dynamics of $y^I(t)$ is by controlling $F_e^I(t)$. Recall from equation (10) that $F_e^I(t)$ has a component contributed by the power flow variations through tie-lines connected to the boundary loads $F_L$ and by the power flow variations through tie-lines connected to the boundary generators $F_G$. Matrix $D_p$ is a function of electrical distances among the generator and load nodes in the area, and it is dependent on the design of the area's transmission system.

With this in mind, one should analyze point-to-point transfer functions between specific components of $F_e^I(t)$ on one side and $F_L$ and/or $F_G$ vectors, on the other side. The components of $F_L$ and/or $F_G$ which have the largest effect on $F_e^I$ are candidates for the best locations of FACTS devices. Note, however, that for a nearly lossless transmission system in the area I all elements of the participation vector $p^I$ are 1, and not much decision making is required in relating dynamics of $y^I(t)$ to the dynamics of $F_e^I(t)$ given in equation (29). For exceptionally lossy lines, components of $p^I$ could deviate considerably away from 1, and this adds yet another step in decision making on the best locations of the FACTS devices.

Formulae of the type presented in this example constitute the first means for deciding on the best locations of FACTS control devices. To illustrate by simulation the effects of direct tie-line flow control on the inter-area dynamics, we consider a specific technology of controlling these flows in terms of voltage phase angle difference across the tie-lines.

Phase-shifting transformers can be used to implement this control. First, we re-write the system model (15) in terms of voltage phase angle differences. For the same 5-bus example, we can write $$\dot{x} = Ax + N\Delta + \dot{d} \quad (37)$$

where $\Delta = [\Delta_1 \ \Delta_2]^T$, and $\Delta_1$ is the phase angle difference across the line connecting nodes 2 and 3, $\Delta_2$ the phase ankle difference across the line connecting nodes 4 and 5. Matrix N is a function of tie-line impedances only. $\dot{d} = [0 - D_P]^T \dot{P}_L$ is the system disturbance due to load variations. It can be shown that only the total (net) power generation of each region is important for inter-area dynamics regulation. Thus, we assume $\Delta_2 = 0$ for simplicity. Assume further lossless system, and define $u = -L_1 \Delta_1$ as the control signal, where $L_1$ is the impedance of the first tie-line. The open-loop model of the entire system (15) becomes $$\dot{x} = Ax + bu + \dot{d} \quad (38)$$

where $b = [0 \ 0 \ 0 \ 1 \ 0 -1]^T$. The open loop inter-area dynamics take the form $$\dot{y}^I = u + \dot{P}_4 \quad (39)$$

$$\dot{y}^{II} = -u + \dot{P}_5 \quad (40)$$

For this small power system the order of the full model (38) is three times the order of the local state space $x_{LC}$ augmented by one, and the model representing the inter-area dynamics (39)–(40) is only two. In general, for realistic size power systems the orders of the two models differ drastically. The proposed tie-line control design uses only the low-order model (39).

It is clear that once the oscilations in either of $y^I$ or $y^{II}$ are supressed, there will be no inter-area oscilations. This is obvious for the 2-area system, since inter-area oscilations are consequences of the power exchange between the two areas.

Control design can be done from either side. In this case, since $y^{II} = P_{G3}$, controlling $y^{II}$ needs only one measurement (compared to two for $y^I$). To illustrate this, assume $$u = k(y^{II} - y_{ref}^{II}) \quad (41)$$

where $y_{ref}^{II}$ is a constant target to be appropriately chosen. The closed-loop dynamics (39)–(40) for the inter-area dynamics have the form $$\dot{y}^I = k(y^{II} - y_{ref}^{II}) + \dot{P}_4 \quad (42)$$

$$\dot{y}^{II} = -k(y^{II} - y_{ref}^{II}) + \dot{P}_5 \quad (43)$$

Clearly the stability requirement for $y^{II}$ dictates k>0.

Figure 3A:
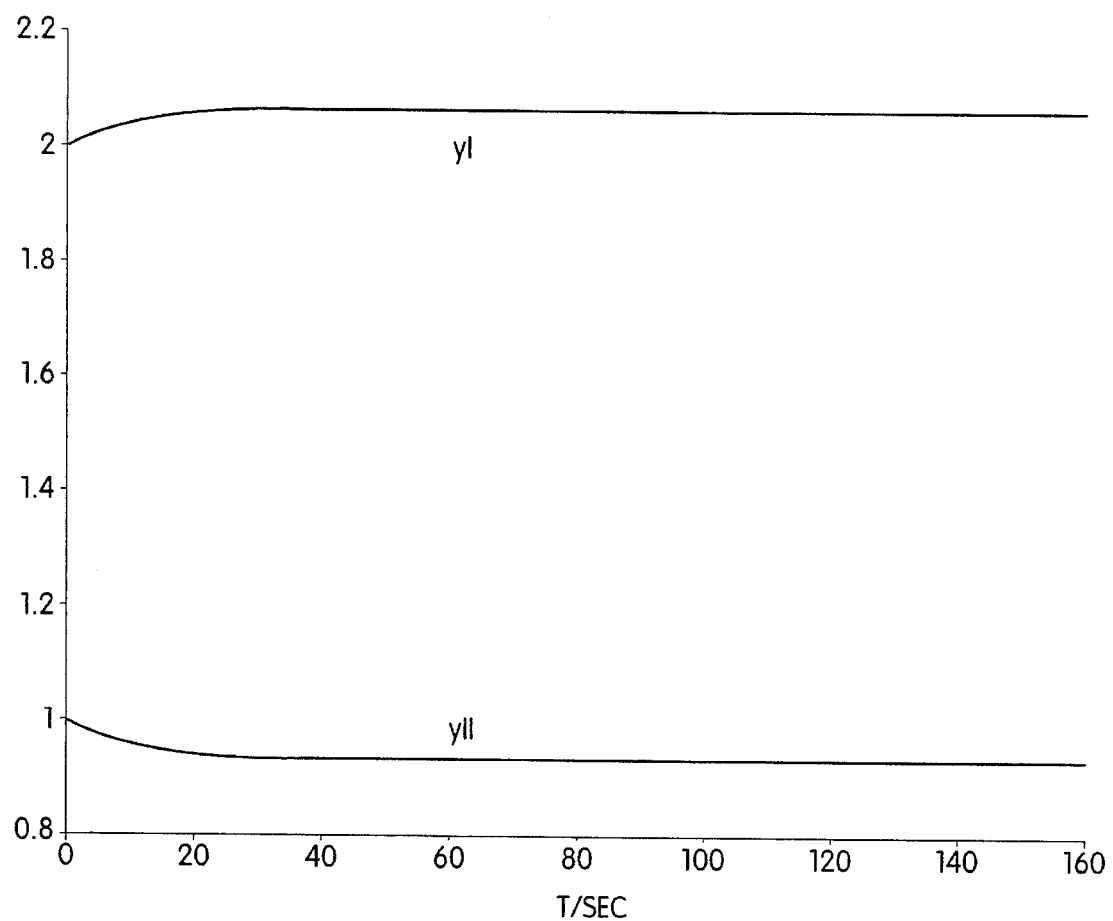
FIGS. 3a–3b are graphs showing the system response after control according to the proposed invention.
Figure 3B:
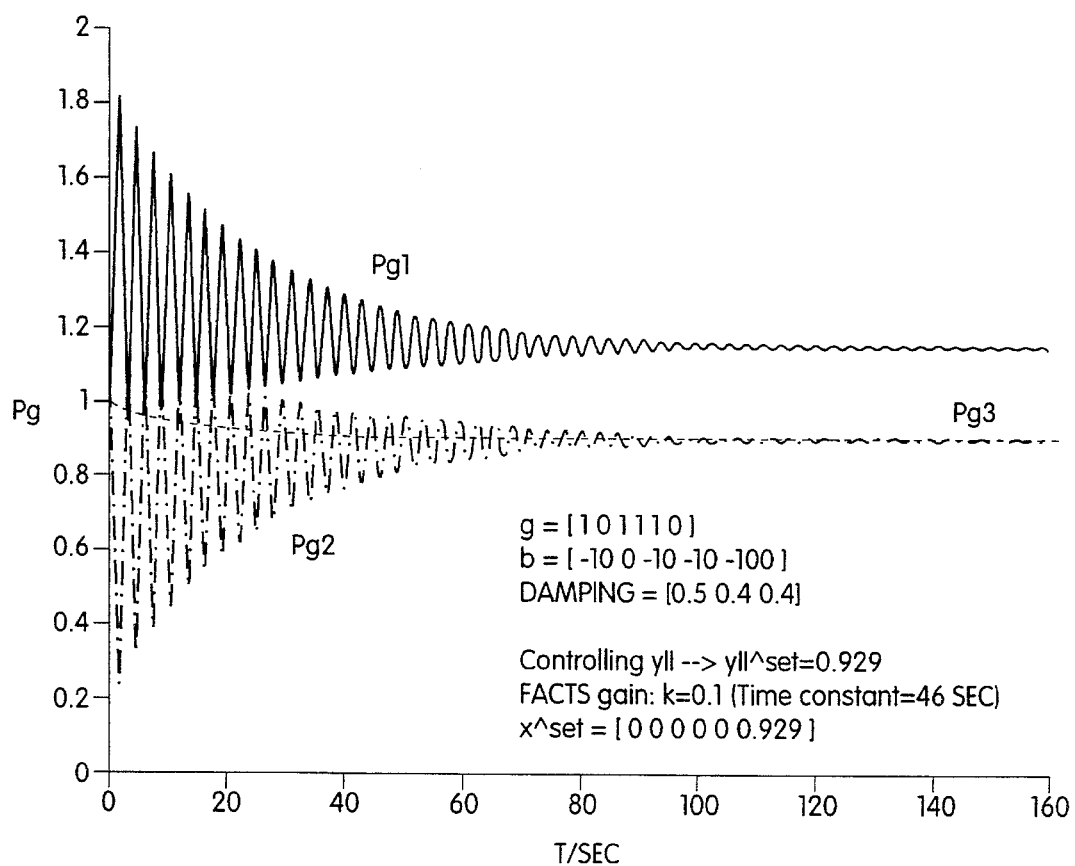

FIG. 3 shows the controlled system response utilizing the present invention where the case for $y_{ref}^{II} = 0.929$ and k=0.1. $y_{ref}^{II}$ is chosen to be the steady-state value of net tie-line flow out of area II prior to adding the new controller. k is chosen such that the settling time for the inter-area dynamics is roughly 46 seconds. Initial conditions for all states are unity.

Figure 4A:
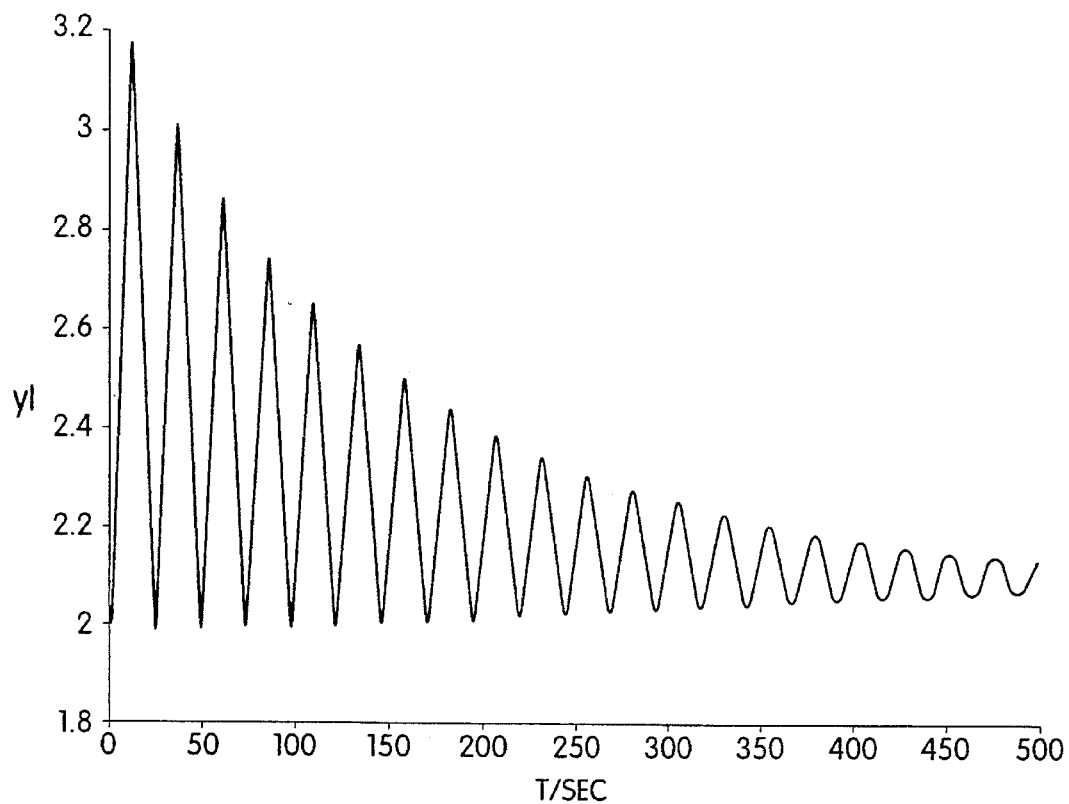
FIGS. 4a–4c are graphs showing the system response without use of the proposed invention.
Figure 4B:
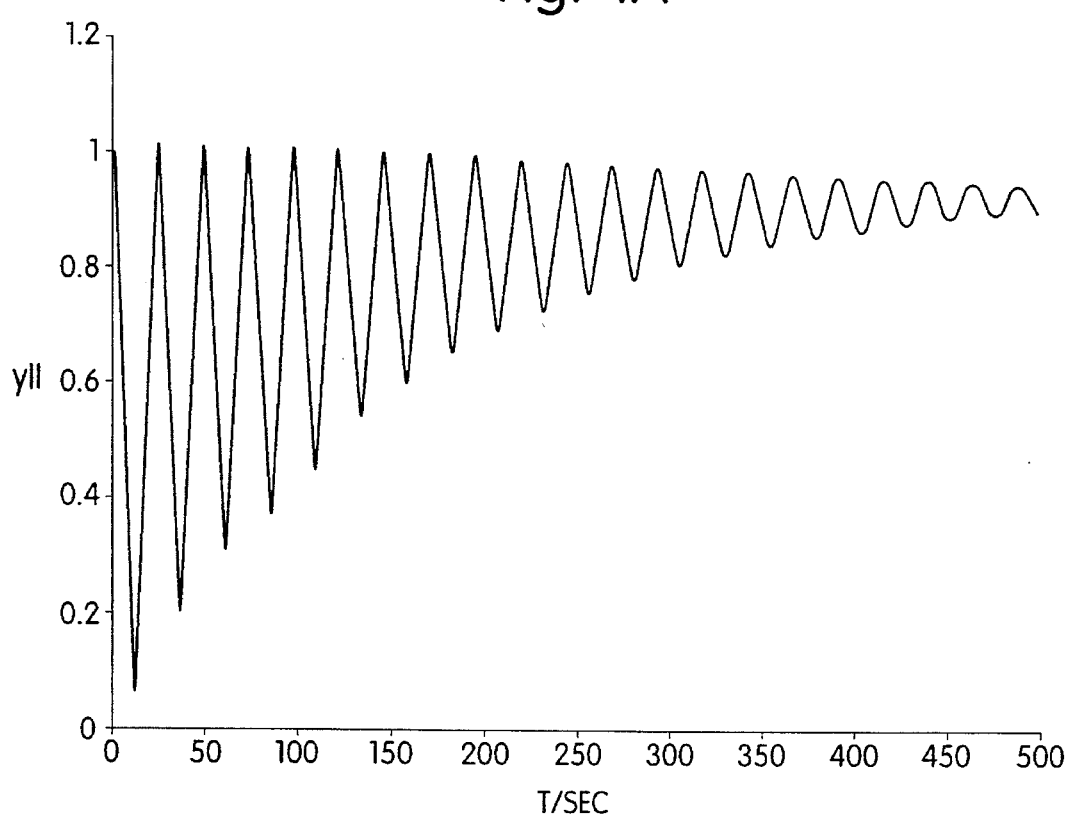
Figure 4C:
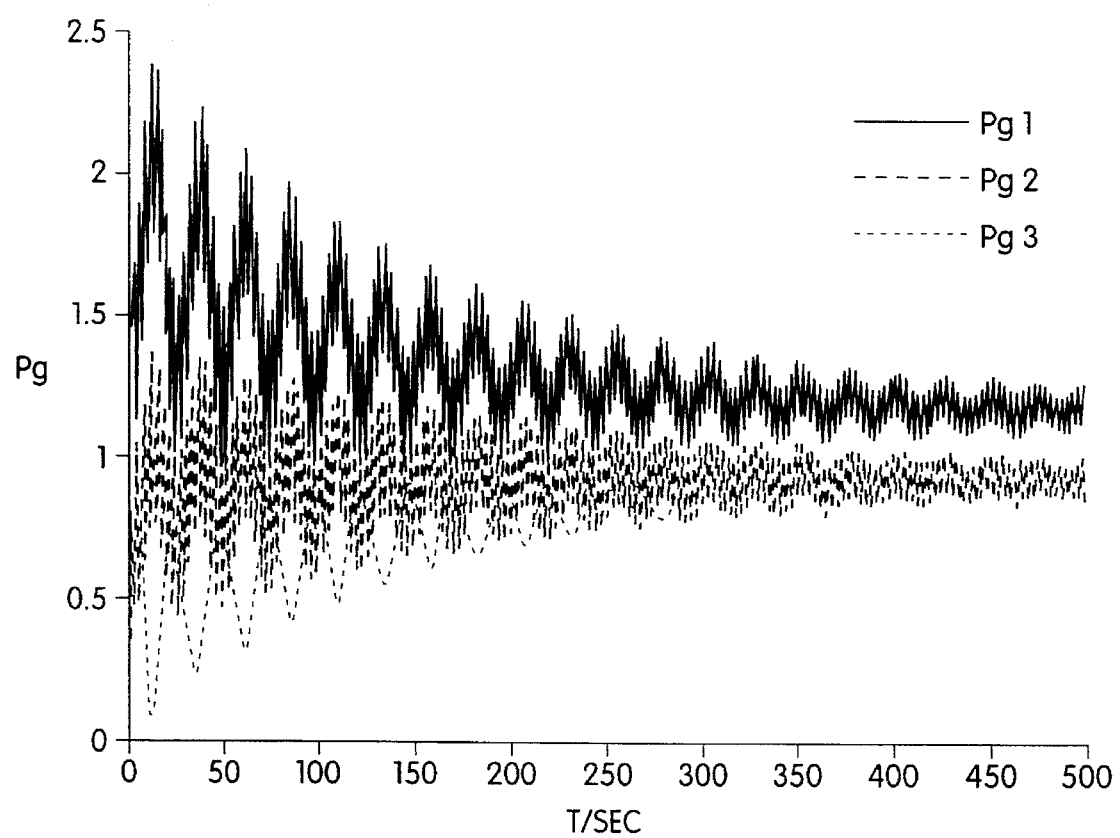

As comparison, FIG. 4 shows the system responses when there is no direct tie-line flow control. Clearly in FIG. 3 the slow mode corresponding to the inter-area oscillations is eliminated.

4.2) Only a Subset of Tie-lines Directly Controlled

The fact that the inter-area behavior is contained in the output variable y provides some interesting opportunities for the application of the $H_\infty$ design methodology to the use of FACTS devices for improved transmission grid response. In order to formulate the problem, we make the following assignments, to follow the notation of J. C. Doyle, K. Glover, P. P. Khargonekar, and B. A. Francis. "State space solutions to standard $H_2$ and $H_\infty$ control problems", *IEEE Transactions on Automatic Control*, 34(8):831–847, 1989. First, we separate the tie-line flows into a controlled group and an uncontrolled one, $F_c$ and $F_u$, respectively, via a signed permutation matrix T:

$$\begin{bmatrix} F_L \\ F_G \end{bmatrix} = T \begin{bmatrix} F_u \\ F_c \end{bmatrix} \quad (44)$$

so that $$F_e = [D_p - I]T \begin{bmatrix} F_u \\ F_c \end{bmatrix} = [B_1 \, B_2] \begin{bmatrix} F_u \\ F_c \end{bmatrix} \quad (45)$$

Matrices $B_1$ and $B_2$ are used to differentiate among the tie line power flows $F_c$ directly controlled via FACTS devices and the remaining flows $F_u$. In addition, for the moment it will be assumed that $\dot{P}_L = 0$. We can then write the system model (15) as:

$$\begin{bmatrix} \dot{x}_{LC} \\ \dot{P}_G \end{bmatrix} = \begin{bmatrix} A_{LC} & C_M \\ K_P E & 0 \end{bmatrix} \begin{bmatrix} x_{LC} \\ P_G \end{bmatrix} + B_1 \dot{F}_u + B_2 \dot{F}_c \quad (46)$$

or $$\dot{x} = Ax + B_1 \omega_1 + B_2 u \quad (48)$$

At this point the controlled output, the disturbance and the input have been defined adequately for the purposes of the $H_\infty$ minimization. It remains to define the measurement vector ($y = C_2 x + D_{21} \omega_2$, in the notation of J. C. Doyle, K. Glover, P. P. Khargonekar, and B. A. Francis, "State space solutions to standard $H_2$ and $H_\infty$ control problems", *IEEE Transactions on Automatic Control*, 34(8):831–847, 1989. This could be taken as a vector of generator output powers or intra-area transmission line flows, expressed as a linear function of the state. In addition, appropriate weighting functions $W(j\omega)$ could be defined at the output and input, to tailor the behavior of the resulting controller. Emphasis might be placed on damping a particular inter-area mode, for example, by placing higher weighting at that frequency. Several observations can be made here:

Because the output captures only the inter-area behavior, the $H_\infty$ procedure will act to maximize the effectiveness of the FACTS device to inter-area modes, while still assuring the stability of the local area dynamics. Moreover, the sensitivity of the controller to the effects of flows on uncontrolled tie lines will also be minimized.

This implies that a simple hierarchical method might be adopted, in which local controls could be tuned almost exclusively for local oscillatory modes while the effectiveness of FACTS devices on critical tie lines would be maximized for inter-area modes. This effect could also be tailored by providing a weighting function with a high-frequency penalty.

4.3) Implementation of Control Design

Figure 5:
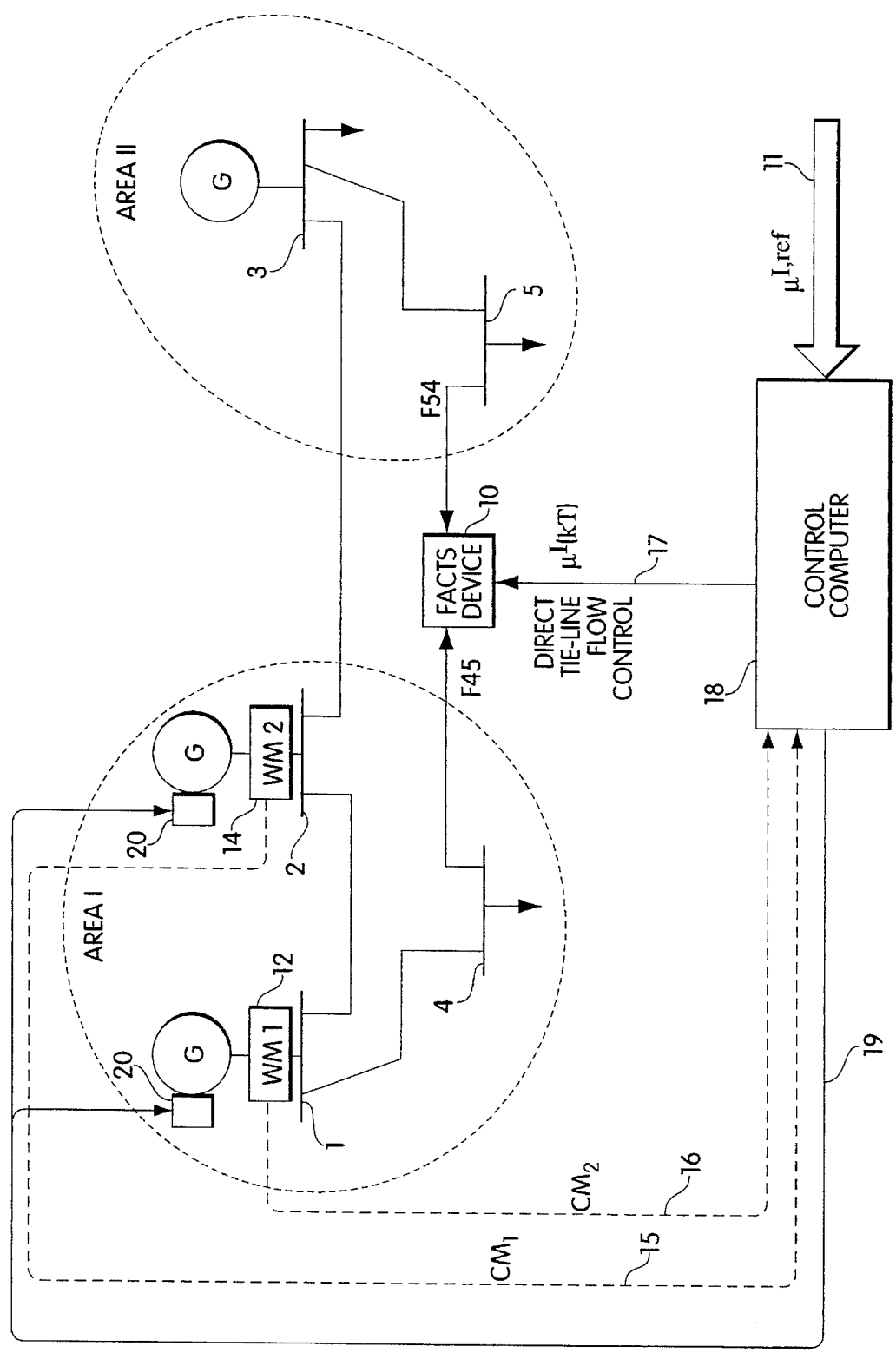
FIG. 5 is the schematic representation of measurement, communications and control signal flows of the invention.
Figure 6:
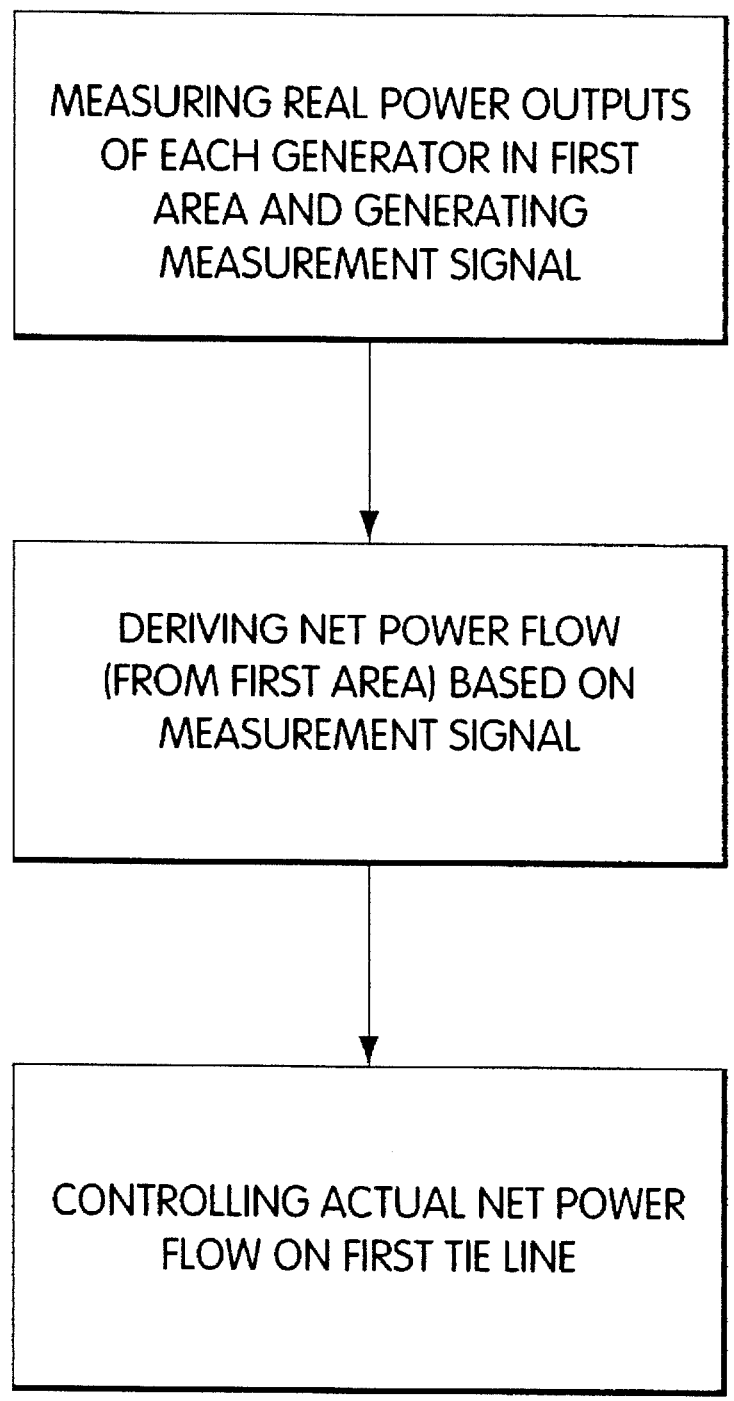
FIG. 6 is a flow chart showing the method of the present invention.

A schematic representation of the measurement/communications and control hardware needed for the actual implementation of the invention is given in FIG. 5. This is illustrated on the example of a small electric power system given in FIG. 2. Only one FACTS control device 10 for direct control of the tie-line flow $F_{45}$ is drawn. The desired (set) value for the net tie line power flow out of area I, $y^{I,ref}$ received on input line 11, is used as the reference signal to the control computer 8. The real power outputs from the generators in area I $P_{G1}$ and $P_{G2}$ are measured by standard digital Wattmeters, denoted as $WM_1$ 12 and $WM_2$ 14. The sampling rate for the measurements is dependent on the desired dynamic performance of $y^I(t)$. For a typical range of inter-area oscillations (below 1 Hz) a sampling rate on the order of $f_s = 1$ kHz would be more than satisfactory. These digital signals $$P_{G1}(kT) \text{ and } P_{G2}(kT), k=0,1 \ldots, T=1/f_s$$

are communicated in real-time via communication channels $CM_1$ 15 and $CM_2$ 16 directly from the generators to the control computer 18.

In the computer device these digital signals are processed to derive the actual net tie-line flow $y^I(kT)$ of area I according to the invention.

They are further compared with the desired $y^{I,ref}$ to obtain the error signal $e^i(kT)$. The control signal $u^i(kT)$ on line 17 becomes a function of this error. Depending on the type of controller used, the control signal could comprise a component proportional (P) to this error signal plus a component which is the integral (I) and/or derivative (D) of the error signal. This design is well understood under the acronym of a PID controller design. Adequate tuning of controller gains for achieving desired dynamic response of $y^I(t)$ is standard.

5) Conclusions

This invention introduces for the first time an approach to the regulation of the inter-area dynamics via direct tie-line flow control using only a reduced-order model relevant for this dynamics. The approach allows for a systematic control design regarding both best placement of the controllers and their control logic. It is shown that the inter-area dynamics could be regulated using standard design for low-order linear dynamical systems.

What is claimed is:

1. In an electrical power system which includes a plurality of areas with generators and loads, the areas being electrically connected by tie lines, the improvement comprising:

means for measuring a real power output of each generator in a first area, and generating a measurement signal indicative thereof;

means, responsive to the measurement signal, for deriving a net power flow from the first area to the remainder of the system along the tie lines, and generating a derivation signal indicative thereof; and means, responsive to the derivation signal, connected to at least one tie line from the first area for directly and dynamically controlling the actual net power flow from the first area to the remainder of the system along the tie lines, wherein the deriving means determines a weighted sum of the real power outputs from the generators in the first area which are weighted with respect to the electrical distance of each generator from a location on the tie line where the control is applied.

2. The system of claim 1, wherein the means for controlling are connected to each of the tie lines to cause the actual net power flow to approach a desired value.

3. The system of claim 1, wherein the control means compares the derivation signal to a desired net power flow and determines a net error signal.

4. The system of claim 3, wherein the control means directly adjusts the actual power flow on at least one tie line in order to cause the net error signal to approach zero.

5. The system of claim 1, wherein the control means includes means for adjusting a voltage phase angle difference across the tie line where the control is applied.

6. The system of claim 1, wherein the control means includes means for adjusting the magnitude and phase angle of a voltage at one end of the tie line where the control is applied.

7. The system of claim 1, wherein the control means comprises a static phase shifter transformer having an electronically controlled tap position.

8. The system of claim 1, wherein the control means incorporates Flexible AC Transmission Systems (FACTS) technology.

9. The system of claim 1, wherein the control means comprises means for converting an alternating current signal at one end of the tie line to a direct current signal, and means at the other end of the tie line for converting the direct current signal to an alternating current signal.

10. The system of claim 9, wherein the control means comprises an HVDC transmission line.

11. The system of claim 1, wherein the control means provides stabilization of the inter-area dynamics in the frequency range of below about 1 Hz.

12. The system of claim 1, wherein the control means suppresses inter-area oscillations.

13. The system of claim 1, wherein the measuring means converts an analog real power output from the first area to a digital measurement signal and the deriving means is a digital processor which processes the digital measurement signal.

14. The system of claim 1, wherein the derived net power flow $y^i$ is determined from:

$$y^i = p^i P_G^i \qquad (a)$$

where $p^i$ is a participation factor;

$p_G^i$ is a set of the real power outputs from each of the generators in the first area; and i designates the first area having a plurality of generators G and loads L electrically connected by a network N; and wherein $p^i$ is calculated from:

$$p^i K_p^i = 0 \qquad (b)$$

where:

$K_p^i$ is an effective participation factor of generator and load power in derived net power flow $y^i$, and is defined by:

$$K_p^i = J_{GG} + J_{GL} C_\omega \qquad (c)$$

where:

$C_\omega$ represents for a contribution of power changes at loads in derived net power flow $y^i$, and is defined by:

$$C_\omega = -J_{LL} J_{LG} \qquad (d)$$

where J is a sensitivity matrix of real power flows into the network with respect to phase angles, and is defined by:

$$J = \frac{\partial P^N}{\partial \underline{\delta}} = \begin{bmatrix} J_{GG} & J_{GL} \\ J_{LG} & J_{LL} \end{bmatrix} \qquad (e)$$

where $\underline{P}^N$ is a complex power flow defined by:

$$\underline{P}^N = (\underline{P}_G^N, \underline{P}_L^N) \qquad (f)$$

where $\underline{P}_G^N$ is a set of all real power flows from all generators in area i into the network $\underline{P}_L^N$ is a set of all real power flows from all loads in area i into the network N;

and where i is a complex phase angle defined by:

$$\underline{\delta} = (\underline{\delta}_G, \underline{\delta}_L) \qquad (g)$$

where:

$\underline{\delta}_G$ is a set of all voltage phase angles of all generators in area i;

$\underline{\delta}_L$ is a set of all voltage phase angles of all loads in area i;

and where:

$J_{GG}$ is a sensitivity submatrix $(\partial \underline{P}_G^N / \partial \underline{\delta}_G)$ of net power flows out of generators with respect to generator phase angle;

$J_{LG}$ is a sensitivity submatrix $(\partial \underline{P}_L^N / \partial \underline{\delta}_G)$ of net power flows out of loads with respect to generator phase angle;

$J_{GL}$ is a sensitivity submatrix $(\partial \underline{P}_G^N / \partial \underline{\delta}_L)$ of net power flows out of generators with respect to load phase angle;

$J_{LL}$ is a sensitivity submatrix $(\partial \underline{P}_L^N / \partial \underline{\delta}_L)$ of net power flows out of loads with respect to load phase angle;

where all voltages are measured between a node in the network and ground.

15. The system of claim 1, comprising a plurality of areas connected by a plurality of tie lines, and the control means comprising a plurality of controllers positioned on different tie lines which control the actual net power flow from different areas.

16. In a method for controlling the net power flow in an electrical power system which includes a plurality of areas with generators and loads, the areas being electrically connected by tie lines, the improvement comprising:

measuring a real power output of each generator in a first area, and generating a measurement signal indicative thereof;

deriving, in response to the measurement signal, a net power flow from the first area to the remainder of the system along the tie lines, and generating a derivation signal indicative thereof; and dynamically controlling, in response to the derivation signal, the actual net power flow from the first area to the remainder of the system along the tie lines by directly and dynamically controlling the actual net power flow on at least one tie line from the first area, and determining locations in the system at which the dynamic control is applied.

17. The method of claim 16, wherein the controlling step includes controlling the actual net power flow on each tie line to cause the actual net power flow to approach a desired value.

18. The method of claim 16, wherein the deriving step includes determining a weighted sum of real power outputs from the generators in the first area which are weighted with respect to the electrical distance of each generator from a location on the tie line where the control is applied.

19. The method of claim 18, wherein the derived net power flow $y^i$ is determined from:

$$y^i = p^i P_G^i \qquad (a)$$

where $p^i$ is a participation factor;

$P_G^i$ is a set of the real power outputs from each of the generators in the first area; and i designates the first area having a plurality of generators G and loads L electrically connected by a network N; and wherein $p^i$ is calculated from:

$$p^i K_p^i = 0 \quad \text{(b)}$$

where:

$K_p^i$ is an effective participation factor of generator and load power in derived net power flow $y^i$, and is defined by:

$$K_p^i = J_{GG} + J_{GL} C_\omega \quad \text{(c)}$$

where:

$C_\omega$ represents for a contribution of power changes at loads in derived net power flow $y^i$, and is defined by:

$$C_\omega = -J_{LL} J_{LG} \quad \text{(d)}$$

where J is a sensitivity matrix of real power flows into the network with respect to phase angles, and is defined by:

$$J = \frac{\partial \underline{P}^N}{\partial \underline{\delta}} = \begin{bmatrix} J_{GG} & J_{GL} \\ J_{LG} & J_{LL} \end{bmatrix} \quad \text{(e)}$$

where $\underline{P}^N$ is a complex power flow defined by:

$$\underline{P}^N = (\underline{P}_G^N, \underline{P}_L^N) \quad \text{(f)}$$

where $\underline{P}_G^N$ is a set of all real power flows from all generators in area i into the network N;

$\underline{P}_L^N$ is a set of all real power flows from all loads in area i into the network N;

and where $\underline{\delta}$ is a complex phase angle defined by:

$$\underline{\delta} = (\underline{\delta}_G, \underline{\delta}_L) \quad \text{(g)}$$

where:

$\underline{\delta}_G$ is a set of all voltage phase angles of all generators in area i;

$\underline{\delta}_L$ is a set of all voltage phase angles of all loads in area i;

and where:

$J_{GG}$ is a sensitivity submatrix $(\partial \underline{P}_G^N / \partial \underline{\delta}_G)$ of net power flows out of generators with respect to generator phase angle;

$J_{LG}$ is a sensitivity submatrix $(\partial \underline{P}_L^N / \partial \underline{\delta}_G)$ of net power flows out of loads with respect to generator phase angle;

$J_{GL}$ is a sensitivity submatrix $(\partial \underline{P}_G^N / \partial \underline{\delta}_L)$ of net power flows out of generators with respect to load phase angle;

$J_{LL}$ is a sensitivity submatrix $(\partial \underline{P}_L^N / \partial \underline{\delta}_L)$ of net power flows out of loads with respect to load phase angle;

where all voltages are measured between a node in the network and ground.

20. The method of claim 16, wherein the controlling step includes comparing the derivation signal to a desired net power flow and determining a net error signal.

21. The method of claim 20, wherein the controlling step includes directly adjusting the actual net power flow on at least one tie line in order to cause the net error signal to approach zero.

22. The method of claim 16, wherein the controlling step includes adjusting a voltage phase angle difference across the tie line where the control is applied.

23. The method of claim 16, wherein the controlling step includes adjusting the magnitude and phase angle of a voltage at one end of the tie line where the control is applied.

24. The method of claim 16, wherein the controlling step comprises providing a static phase shifter transformer on the tie line and electronically controlling the tap position thereof.

25. The method of claim 16, wherein the controlling step comprises applying high speed switching to alter the electrical characteristics of at least one tie line.

26. The method of claim 16, wherein the controlling step comprises converting an alternating current signal at one end of the tie line to a direct current signal, and converting at the other end of the tie line the direct current signal to an alternating current signal.

27. The method of claim 26, wherein the controlling step comprises utilizing an HVDC apparatus.

28. The method of claim 16, wherein the controlling step provides stabilization of the inter-area dynamics in the frequency range of below about 1 Hz.

29. The method of claim 16, wherein the controlling step suppresses inter-area oscillations.

30. The method of claim 16, wherein the system comprises a plurality of areas connected by a plurality of tie lines, and the controlling step is provided by a plurality of controllers positioned on different tie lines which control the actual net power flow from different areas.

31. The method of claim 16, wherein the locations are determined by the electrical distances of the loads and generators in a given area to an associated tie line.

32. In an electrical power system which includes a plurality of areas with generators and loads, the areas being electrically connected by tie lines, and the generators and loads within a given area being electrically connected by a network, the improvement comprising:

means for measuring a real power output of each generator in a first area, and generating a measurement signal indicative thereof;

a computer, which receives the measurement signal, and derives a net power flow from the first area to the remainder of the system along the tie lines and which derived net power flow accounts for transmission losses within a network of the first area and determines a weighted sum of the real power outputs from the generators in the first area which are weighted with respect to the electrical distance of each generator from a location on the tie line where control is applied, the computer generating a derivation signal indicative thereof; and means, responsive to the derivation signal and connected to at least one tie line from the first area, for directly and dynamically controlling the actual net power flow from the first area to the remainder of the system along the tie lines.

33. The system of claim 32, wherein the computer includes means for scheduling the generation of power within the first area to meet the dynamic power transfer requirements from the first area to the other areas.

34. The system of claim 32, wherein the first area includes at least one generator with a local generator control means, and the computer generates a control signal for use by the local generator control means in controlling the real power output of the generator.

35. The system of claim 32, wherein the means for controlling are connected to each of the tie lines to cause the actual net power flow to approach a desired value.

36. In a method of controlling the net power flow in an electrical power system which includes a plurality of areas with generators and loads, the areas being electrically connected by tie lines, and the generators and loads within a given area being electrically connected by a network, the improvement comprising:

measuring a real power output of each generator in a first area, and generating a measurement signal indicative thereof;

deriving, in response to the measurement signal, a net power flow from the first area to the remainder of the system along the tie lines, and which derived net power flow accounts for transmission losses within a network of the first area and determines a weighted sum of the real power outputs from the generators in the first area which are weighted with respect to the electrical distance of each generator from a location on the tie line where the control is applied, and generating a derivation signal indicative thereof; and dynamically controlling, in response to the derivation signal, the actual net power flow from the first area to the remainder of the system along the tie lines by directly and dynamically controlling the actual net power flow on at least one tie line from the first area.

37. The method of claim 36, further comprising utilizing the derived net power flow for scheduling the generation of power within the first area to meet the dynamic power transfer requirements from the first area to other areas.

38. The method of claim 36, wherein the first area includes at least one local generator control means and the computer generates a control signal for use by the local generator control means in controlling the real power output of the generator.

39. The method of claim 36, wherein the controlling step includes controlling the actual net power flow on each tie line to cause the actual net power flow to approach a desired value.

* * * * *

UNITED STATES PATENT AND TRADEMARK OFFICE
CERTIFICATE OF CORRECTION

PATENT NO. : 5,517,422
DATED : May 14, 1996
INVENTOR(S) : Ilic et al.

It is certified that error appears in the above-indentified patent and that said Letters Patent is hereby corrected as shown below:

Col. 1, line 36 - delete "anti" and substitute -- and --.

Col. 5, line 59 - after "power" insert -- $P_L$. --

Col. 6, line 16 - formula (3) should read -- $T_g \dot{a} = -ra - \omega_G$ --

Col. 8, line 60 - delete "moved" and substitute -- removed --

Col. 10, line 5 - formula (26) should read -- $\dot{y} = pu(y) + d$ --

Col. 10, Line 49 - delete "Fhd $L^{II} = F_{54}$" and substitute -- $F_L'' = F_{54}$ --

Col. 12, Line 9 - delete "anKle" and substitute -- angle --

Col. 13, Line 25 - formula (46) should read $$-- \begin{bmatrix} \dot{x}_{LC} \\ \dot{P}_G \end{bmatrix} = \begin{bmatrix} A_{LC} & C_M \\ K_P E & 0 \end{bmatrix} \begin{bmatrix} x_{LC} \\ P_G \end{bmatrix} + B_1 \dot{F}_u + B_2 \dot{F}_c \quad --$$

Col. 16, Line 3 - after "network" insert -- N --
Col. 16, Line 6 - delete "i" and substitute -- $\delta$ --

Signed and Sealed this

Seventeenth Day of December, 1996

Attest:

BRUCE LEHMAN

*Attesting Officer*  *Commissioner of Patents and Trademarks*